(12) United States Patent
Padmanabhan et al.

(10) Patent No.: US 12,393,850 B2
(45) Date of Patent: Aug. 19, 2025

(54) INFERRING LATENCY SENSITIVITY OF USER ACTIVITY

(71) Applicant: Microsoft Technology Licensing, LLC, Redmond, WA (US)

(72) Inventors: Venkata N. Padmanabhan, Karnataka (IN); Rohan Saxena, Pittsburgh, PA (US); Parth Dhaval Thakkar, Champaign, IL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 904 days.

(21) Appl. No.: 17/566,279

(22) Filed: Dec. 30, 2021

(65) Prior Publication Data

US 2023/0134206 A1    May 4, 2023

(30) Foreign Application Priority Data

Nov. 1, 2021    (IN) .............................. 202141050020

(51) Int. Cl.
  *G06N 5/02*    (2023.01)
  *G06F 9/451*   (2018.01)
(52) U.S. Cl.
  CPC ............... *G06N 5/02* (2013.01); *G06F 9/451* (2018.02)
(58) Field of Classification Search
  CPC ........... G06N 5/02; G06N 20/00; G06F 9/451
  See application file for complete search history.

(56) References Cited

U.S. PATENT DOCUMENTS

| 11,405,329 B1 * | 8/2022 | Cuthbert | G06N 20/00 |
| 2013/0081001 A1 * | 3/2013 | McColl | G06F 11/3419 717/128 |
| 2020/0034882 A1 * | 1/2020 | Deng | G06Q 30/0244 |

OTHER PUBLICATIONS

Asrese, et al., "Measuring Web Latency and Rendering Performance: Method, Tools, and Longitudinal Dataset", In Journal of IEEE Transactions on Network and Service Management, vol. 16, Issue 2, Jun. 1, 2019, pp. 535-549.
Bai, et al., "Understanding and Leveraging the Impact of Response Latency on User Behaviour in Web Search", In Journal of ACM Transactions on Information Systems, vol. 36, Issue 2, Aug. 29, 2017, 42 Pages.
"International Search Report and Written Opinion Issued in PCT Application No. PCT/US22/045830", Mailed Date: Jan. 23, 2023, 13 Pages.
Invitation to file search results or a statement of non-availability pursuant to Rule 70b(1) Received for European Application No. 22800450.3, mailed on Jan. 17, 2025, 01 Page.

* cited by examiner

*Primary Examiner* — Etienne P Leroux
(74) *Attorney, Agent, or Firm* — RAY QUINNEY & NEBEKER; Tiffany B. Healy

(57) ABSTRACT

The systems and methods may analyze an impact of latency on user activities by leveraging the variation of latency seen in the normal course of user activities with an application. The systems and methods may infer the latency sensitivity of users by comparing a biased latency distribution of user actions to an estimate of the underlying unbiased latency distribution. The systems and methods may compute a normalized latency preference of the users using a biased latency probability distribution function and an unbiased latency probability distribution function. The systems and method may use the normalized latency preference to analyze an impact of latency on the user activities.

20 Claims, 9 Drawing Sheets

INFERRING LATENCY SENSITIVITY OF USER ACTIVITY

CROSS-REFERENCE TO RELATED APPLICATIONS

This application claims priority to and the benefit of Indian Patent Application No. 202141050020, filed on Nov. 1, 2021, which is hereby incorporated by reference in its entirety.

BACKGROUND

Users engage with a variety of online services, such as email, search, e-commerce, and more. Latency is a key metric for defining the user experience in the context of online services. Users generally react negatively to latency, such that, the higher the latency of a service, the less activities that users are likely to perform using the service.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations relate to a method for identifying latency preferences of users. The method may include determining a biased distribution of latency of a plurality of user actions for an application over a timeframe, wherein the biased distribution of latency includes a latency for each user action of the plurality of user actions. The method may include inferring an unbiased distribution of latency based on the biased distribution of latency by selecting random times within the timeframe of the biased distribution of latency and using the latency for a user action at or close to the chosen random times for the unbiased distribution of latency. The method may include computing a latency preference of the plurality of user actions as a ratio of the probability density function of the biased distribution of latency and the probability density function of the unbiased distribution of latency. The method may include computing a normalized latency preference by dividing the latency preference by the latency preference corresponding to a reference latency. The method outputting the normalized latency preference as a function of latency.

Some implementations relate to a method for determining an unbiased latency. The method may include obtaining a biased distribution of latency that includes a plurality of user actions with an associated latency over a timeframe for an application. The method may include selecting random points in time of the timeframe. The method may include identifying latency samples from the plurality of user actions in the biased distribution of latency based on the points in time selected. The method may include inferring an unbiased distribution of latency for the application using the latency samples.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
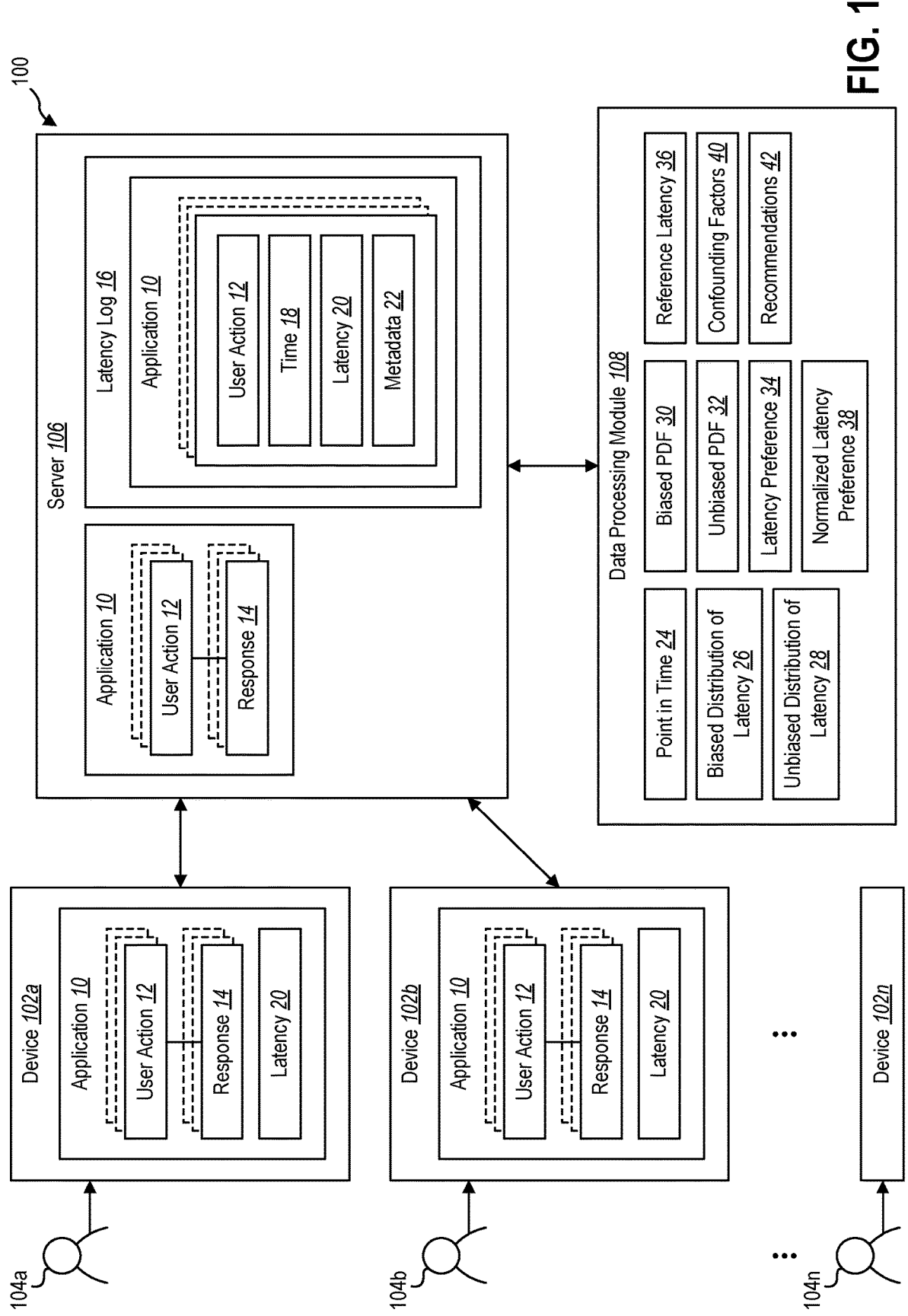
FIG. 1 illustrates an example environment for analyzing the latency of application in accordance with implementations of the present disclosure.

This disclosure generally relates to analyzing the latency of application services. Latency is a key metric for defining the user experience in the context of online services, such as, email, search, and e-commerce. Users generally react negatively to latency. The higher the latency of a service, the less activities that users are likely to perform using the service, which in turn means lost revenue for commercial services. Currently, the analysis of the impact of latency on online services for user activity is based on active intervention (e.g., deliberately manipulating or degrading the latency for some users some of the time and then measuring the impact on user activity).

The present disclosure automatically infers the impact of latency of services on user activities based on analyzing natural experiments (e.g., leveraging the variation in user-experienced latency seen in the normal course of user activity). The present disclosure compares the distribution of latency of the user actions actually performed by the users (e.g., a biased distribution of latency, which reflects the impact, if any of latency on user activity) when interacting with the service with the underlying distribution of latency independent of whether the users choose to perform any action (e.g., an unbiased distribution of latency, which reflects the underlying latency of actions without regard to when user actions are actually performed). The unbiased distribution of latency is estimated by sampling random points in time and picking out the temporally nearest samples from the biased distribution. If the biased distribution is shifted to the left (towards lower latency) as compared to the unbiased distribution, the shift may indicate a greater likelihood of user activity when the latency is lower.

The comparison of the biased distribution of latency and the unbiased distribution of latency helps compute the user preference based on latency. Specifically, with the biased and unbiased distributions expressed as Probability Density Functions (PDFs), computing the ratio of the biased PDF to the unbiased PDF yields the latency preference. Furthermore, to facilitate comparison of the latency preference across user groups, user actions, etc., the latency preference is normalized with respect to a chosen reference latency, yielding a normalized latency preference, which quantifies the relative likelihood of user activity at different levels of latency (the normalized latency preference would be equal to 1 at the reference latency, and greater or lower than 1 at latencies that are more or less preferred by users).

The present disclosure may optionally account for confounding factors, such as, time of day effects, content driven user activity preferences, user conditioning based on the typical latency they experience and so have come to expect, and/or different classes of users (business customers that pay for the service versus users that use the service for free). Such confounding factors could each impact the level of user activity, separate from the impact of latency. The present disclosure may adjust the normalized latency preference based on the confounding factors to reduce or minimize the effect of the confounding factors on the normalized latency preference.

One technical benefit of the present disclosure is helping guide aimed at the improvement of latency of an application. The analysis of the present disclosure may, for instance, help identify individual actions within an application as the ones that are most latency sensitive and so deserve the greatest attention. For example, the analysis may focus on the inferred latency preference of user actions for selecting a mail item, switching folders, and/or searching for an online email service. The present disclosure may use the analysis to enable prioritization of areas of the application to modify for change where improvement in latency of the application may make the biggest impact on a performance of the application and/or the users actions using the application.

By leveraging the variation in latency that happens in the normal course of user actions, the present disclosure uses a passive approach for analyzing the impact of latency on user activities, and thus, totally avoids the risk of impact on the user activities with active intervention.

Referring now to FIG. 1, illustrated is an example environment 100 for analyzing the latency of applications. The environment 100 may have a plurality of users 104 (e.g., 104a to 104n, where n is a positive integer) interacting with a plurality of devices 102 (e.g., 102a to 102n) to access one or more applications 10. The users 104 may be located in different locations worldwide. In some implementations, the applications 10 may be used to access services provided by the server 106. Examples of the applications 10 include, but are not limited to, email applications, an online shopping application, and/or a search application. When a user 104 initiates a user action 12 for the application 10 (e.g., opening an email by clicking on the email, clicking a button to place a product in a shopping cart, initiating a search by pressing a search button), the server 106 receives the user action 12 and provides a response 14 (e.g., opening the email, placing the product in the shopping cart, performing a search and providing search results) to the application 10.

A latency log 16 may record a measured latency 20 for different user actions 12 for the application 10. The latency 20 is a time it takes for the user 104 to get a response 14 for a user action 12. For example, the latency 20 may be the measured time from when the user initiated the user action 12 (e.g., clicking on an email, initiating a search by pressing the search button) until the response 14 is received by the user 104. As such, the latency 20 may be indicative of the user's 104 experience with the user action 12. A higher latency may result in a slower experience for the user 104 with the user action 12 and a lower latency may result in a faster experience for the user 104 with the user action 12. Thus, if the latency 20 is large (e.g., the total time from the start of an action until a response is received), the latency 20 may impact the user's 104 willingness to continue using the application 10 and/or performing the user action 12.

The latency log 16 includes the user action 12 (e.g., selecting a mail item, switching between mail folders) and a time 18 the user action 12 started. The time 18 may be based on timestamps recorded at the server 106 for the user action 12. The latency log 16 also includes a measured end-to-end latency 20 of the user action 12. The latency 20 may be measured by the client (e.g., web browser) as the time interval from when the user 104 initiates an action (e.g., clicking a mail item) until the end of the user action 12 (e.g., when the mail item is rendered on the device 102). The measured latency 20 may be measured by the devices 102 and conveyed to the server 106, where the user action 12, the time 18 the user action 12 is initiated by the user 104, and the measured latency 20 are logged in the latency log 16 for the application 10. The latency 20 may also be measured by the server 106.

The latency log 16 may also include metadata 22. The metadata 22 may provide additional information about the user 104 performing the user action 12 and/or provide additional information about the user action 12. The metadata 22 may be obtained from user profile information of the users 104 and/or a context of the users 104 (e.g., time of day, location of the user). Example metadata 22 includes, but is not limited to, a subscription type of the user 104 (e.g., whether the user 104 is a business user paying for the service or a consumer user using the service for free), a type of the user action 12, a location of the user 104 when accessing the application 10, an indication of the quality network connectivity of the user 104, a time of day the user actions 12 occurred, and/or date information for when the user actions 12 occurred. The metadata 22 may be used to identify characteristics of the users 104 and/or a context of the user action 12 and segregate the analysis of the data included in the latency log 16 based on user groups and/or different contexts.

The latency log 16 includes a tuple of data (the time 18, the user action 12, the latency 20, and/or any metadata 22) for every user action 12 received from the plurality of users 104 for the application 10. Each entry in the latency log 16, is annotated with a type of user action 12 (e.g., placing an item in a shopping cart, initiating a search, opening an email message), the time 18 the user action started (e.g., a timestamp indicating when a user action 12 is initiated), and the measured latency 20 for the user action 12 (e.g., from the time an action is initiated until a response is received). The latency log 16 may also include the metadata 22 for the user 104 (e.g., an anonymized user identification of the user 104). The latency log 16 includes multiple types of user actions 12 from different users 104 using the application 10. For example, the latency log 16 includes several billion user actions 12 received from millions of users 104 worldwide for accessing an online web email service. The latency log 16 aggregates the user actions 12 received from each of the devices 102 of the plurality of users 104.

The identity of the users 104 and the content of the data accessed by the users 104 is of no concern to the data processing module 108. As such, the latency log 16 maintains the data privacy of the users 104 by applying different techniques to the user actions 12 for abstracting the data for the user actions 12 without identifying the content of the data (e.g., identifying the user actions 12 as opening the mail item without looking at the contents of the mail item opened) and without identifying the users 104. The latency log 16 may abstract the metadata 22, for example, from the user profiles of the user or a user identification of the user to identify characteristics of the user 104 (e.g., a business customer, a user located in Europe) without identifying the user 104.

The server 106 may be in communication with a data processing module 108 that processes the latency logs 16 and analyzes the latency 20 of the different user actions 12. The data processing module 108 may use one or more machine learning models to process and/or analyze the large volume of data obtained in the latency logs 16.

The data processing module 108 may determine a biased distribution of latency 26 for the user actions 12 for the application 10 by the plurality of users 104. To an extent a user 104 has preferences for latency 20, the biased distribution of latency 26 reflects the user's 104 preferences since the latency logs 16 are for the user actions 12 already taken by the user 104. If the users 104 dislike high latency, the users 104 may tend to perform fewer user actions 12 for an application when the latency 20 is high as compared to when the latency 20 is low, and thus, exhibiting a bias towards lower latency. For example, when the service for the application 10 is fast and responsive (e.g., a lower latency), the users 104 may be more likely to stay on the application 10 and perform more actions, and if the service of the application 10 is slow and unresponsive (e.g., a higher latency), the users 104 may prefer to take a break from the application 10. User activity (e.g., user actions 12 for the application 10) may be concentrated in periods of low latency, and thus, provides a biased view of the underlying latency distribution.

The data processing module 108 may use the latency log 16 to construct the biased distribution of latency 20 for the user actions 12 for the application 10. The data processing module 108 uses the latency 20 of each user action 12 at the time 18, as recorded in the latency log 16, to determine the biased distribution of latency 26 for the user actions 12.

The data processing module 108 may construct a biased probability density function (PDF) 30 of the biased distribution of latency 26. The biased PDF 30 reflects the bias, if any, on the part of users 104 to perform more frequent or less frequent user actions 12 based on the latency 20. In some cases, such bias may arise because of explicit user preference (e.g., the users 104 may use a service less when the latency 20 is high). In other cases, the latency 20, being in the users' 104 critical path, may slow the users 104 down, and thereby, result in fewer user actions 12. For example, a user 104 who is scanning through the new emails that have arrived in an inbox may get slowed down if the action of clicking on and opening each email takes longer.

The data processing module 108 may use the biased distribution of latency 26 to infer an unbiased distribution of latency 28. The unbiased distribution of latency 28 may be estimated by sampling random points in time and picking out the temporally nearest samples from the biased distribution of latency 26. The unbiased distribution of latency 28 may reflect the inherent or underlying latency distribution independent of the user actions 12. The unbiased distribution of latency 28 needs to be inferred by the data processing model 108 through indirect means, since the unbiased distribution of latency 28 corresponds to the latency 20 at times that are unrelated to when the users 104 actually made accesses, and therefore, the data processing module 108 may not have direct latency measurements because the data processing module 108 is using the latency logs 16 from the natural interactions of user activity with the application 10 (e.g., when the user actions 12 naturally occur from the users 104 with the application 10).

The data processing module 108 may approximate the unbiased distribution of latency 28 samples by repeatedly picking points in time 24 uniformly at random and picking a latency sample from the biased distribution of latency 26 that is closest to the chosen point in time 24. The data processing module 108 may select the latency sample (e.g., the latency 20 of a user action 12 at a time 18) that is closest in time to the chosen point in time 24. In some implementations, if there are multiple latency samples at the chosen point in time 24, the data processing module 108 may pick one of the latency samples at random (e.g., selecting one of the measured latency 20 of the user actions 12 with times 18 that are close to the chosen point in time 24). In some implementations, if there are multiple latency samples at the chosen point in time, the data processing module 108 may take an average of the latency samples (e.g., take an average of the measured latency 20 of the user actions 12 with times 18 that are close to the chosen point in time 24). By taking the latency samples at random times, the data processing module 108 may get a sample of the measured latency 20 at times not influenced by the user's 104 choice.

The data processing module 108 may construct an unbiased probability density function (PDF) 32 of the unbiased distribution of latency 28. In an implementation, the biased PDF 30 and the unbiased PDF 32 may be computed as histograms with a time bin of 10 milliseconds (ms).

The data processing module 108 may also calculate a latency preference 34 corresponding to each latency 20. The data processing module 108 calculates the raw latency preference 34 as the ratio of:

$$B/U, \quad (1)$$

where B is the biased PDF 30 and U is the unbiased PDF 32. The latency preference 34 may be a noisy curve, and thus, the data processing module 108 may perform processing to smooth the latency preference 34. In some implementations, the data processing module 108 uses the Savitzky-Golay filter, with a window size of 101 and polynomial degree of 3 to smooth the latency preference 34 estimate. Any type of processing may be performed by the data processing module 108 to smooth the latency preference 34.

The data processing module 108 may also select a preference corresponding to a reference latency 36 and may normalize the latency preference 34 to obtain a normalized latency preference 38. The data processing module 108 may divide the other latency values in the latency preference 34 by the latency preference corresponding to the reference latency 36 to generate the latency values in the normalized latency preference 38. For example, a normalized latency preference of x (e.g., 0.8) at a particular level of latency means that all other factors (e.g., confounding factors 40) being equal, the user 104 is (1−x)×100% (e.g., 20%) less active at this latency as compared to the reference latency 36. As such, the normalized latency preference 38 may be equal to 1 at the reference latency 36, and greater or lower than 1 at latencies that are more or less preferred by the users 104.

The data processing module 108 may also identify one or more confounding factors 40 that may impact the user actions 12 with the application 10. The data processing module 108 may adjust the normalized latency preference 38 based on the confounding factors 40 to mitigate or minimize an effect of the confounding factors 40 on the normalized latency preference 38. The confounding factors may impact the level of user activity, separate from the impact of latency.

One example confounding factor 40 includes the time of day or the day of week when the user actions 12 occurred. The time of day or the day of week may have a significant impact on user activity. For example, the users 104 may be less likely to be active during the middle of the night than during daytime, regardless of the latency. Likewise, the users 104 may be less (or, depending on the service, more) active during the weekend than during the weekdays, again, regardless of the latency. The normalized latency preference 38 may illustrate fewer user actions 12 (e.g., accesses by the users 104 when latency is low) not because the users 104 have an aversion to low latency but because of the time confounder (e.g., users may be less active at night).

The data processing module 108 may adjust the normalized latency preference 38 to account for the time of day or the day of the week confounding factor 40 by pooling together data from across different hours in the day and modeling the time confounder as a time-based activity factor that reflects how active the user 104 is during a particular time of day. For example, the time-based activity factor may likely be high during the daytime and low in the middle of the night. The data processing module 108 may estimate the time-based activity factor using different time slots. The data processing module 108 may compute an average of the time-based activity factor across different latencies for the different time slots to estimate the overall time-based activity confounding factor 40.

The data processing module 108 may adjust the normalized latency preference 38 based on the estimated time-based activity confounding factor 40. The adjustment helps neutralize the time confounding factor 40. For example, the low count of user actions 12 in the middle of the night may be replaced with a higher count of user actions 12 commensurate with a greater prevalence of low latency during the nighttime.

Another example confounding factor 40 includes content driven user activity preferences. Depending on the content, the user 104 may be more or less active, independent of other factors, such as, the latency 20. The content of the user actions 12 may also impact the volume of activity. The user actions 12 may be of different types, each entailing a different level of user engagement (e.g., clicking on an email, performing a search). In addition, the content returned by the server 106 may determine future actions (e.g., whether the relevant results are returned at the top in which case the user 104 may be led away from a search service, or the results may be a poor match for the search query in which case the user 104 might invoke another search after refining the search terms). The data processing module 108 may adjust the normalized latency preference 38 based on the content driven user activity preference confounding factor 40, which may help neutralize the content driven user activity preference confounding factor 40 on the latency preference.

Another confounding factor 40 includes user conditioning based on the typical latency the users' experience and have come to expect. User conditioning may have a bearing on the latency sensitivity of the users 104. For example, if a user 104 expects low latency because the user 104 has a strong network connection, the user 104 may react more negatively than other users who may be accustomed to poor latency (e.g., users in geographical areas with slower network connections). The data processing module 108 may adjust the normalized latency preference 38 based on the user conditioning confounding factor 40 to minimize or mitigate an effect of the user conditioning confounding factor 40 on the normalized latency preference 38.

The data processing module 108 may analyze the user actions 12 based on different action types and determine a normalized latency preference 38 separately for each action type. The data processing module 108 may also analyze the user actions 12 based on different user groups and determine separate normalized latency preferences 38 for each user group. The data processing module 108 may also analyze a combination of different user actions 12 and different user types and generate different normalize latency preferences 38 for a combination of user groups and user action types. As such, the data processing module 108 may generate the normalized latency preferences 38 for different action types and/or user groups. The normalized latency preference 38 may be output and used by individuals to identify an impact of latency 20 on the user activities (e.g., the user actions 12 for the application 10).

The data processing module 108 may generate one or more recommendations 42 based on the normalized latency preference 38. The one or more recommendations 42 may automatically identify areas (e.g., features or functionalities) of the application 10 that may have an impact of latency 20 based on the normalized latency preference 38. Individuals may use the recommendations 42 to prioritize the identified areas of the application 10 for latency improvement.

For example, the recommendations 42 may provide an insight that the select mail feature of a mail application is more sensitive to latency (i.e., has a steeper latency preference curve) as compared to a compose and send feature of the mail application. Thus, the service owner of the application 10 may focus their efforts based on the insights provided in the recommendation 42 to reduce the latency of the select mail feature, and thus, increase the level of user activity 12.

The environment 100 may have multiple machine learning models running simultaneously. In some implementations, one or more computing devices (e.g., the server 106 and/or the devices 102) are used to perform the processing of environment 100. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the applications 10, the latency logs 16, and/or the data processing module 108 are implemented wholly on the same computing device. Another example includes one or more subcomponents of the applications 10, the latency logs 16, and/or the data processing module 108 implemented across multiple computing devices. Moreover, in some implementations, the applications 10, the latency logs 16, and/or the data processing module 108 are implemented or processed on different server devices of the same or different cloud computing networks. Moreover, in some implementations, the features and functionalities are implemented or processed on different server devices of the same or different cloud computing networks.

In some implementations, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular embodiment. In some implementations, the components of the environment 100 include hardware, software, or both. For example, the components of the environment 100 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 100 include hardware, such as a special purpose processing device to perform a certain function or group of functions. In some implementations, the components of the environment 100 include a combination of computer-executable instructions and hardware.

As such, the environment 100 may be used to automatically analyze an impact of latency on user activities (e.g., the user actions 12) of the applications 10. The environment 100 leverages the variation in latency that happens in the normal course of user actions 12 with the application 10 without active intervention (e.g., deliberately manipulating the latency for some users and measuring the impact on user activity).

Figure 2:
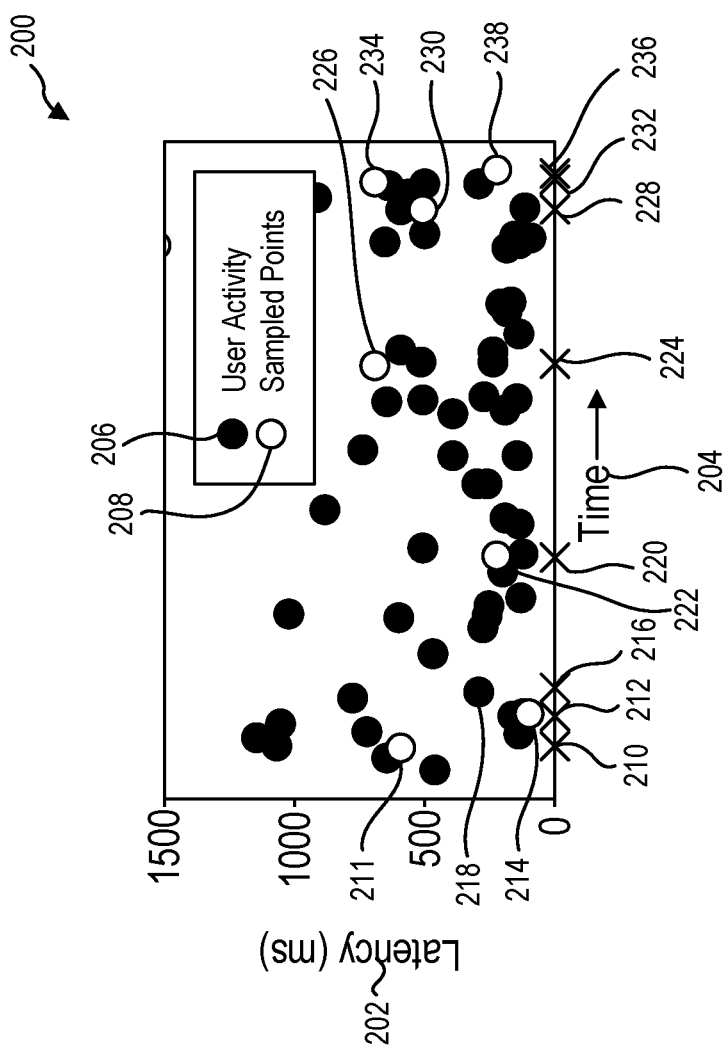
FIG. 2 illustrates an example graph illustrating different samples of user activities over time and the measured latency for the user activities in accordance with implementations of the present disclosure.

Referring now to FIG. 2, illustrated is a graph 200 illustrating different samples of user activities (e.g., user actions 12 with an application 10) over time and the measured latency for the user activities. The y-axis 202 illustrates the measurement of latency in milliseconds (ms) and the x-axis 204 illustrates time. The measured latency may be determined based on the latency 20 (FIG. 1) included in the latency logs 16 (FIG. 1) for the user action 12 (FIG. 1). For each user action 12 included in the latency logs 16, the latency logs 16 indicate the time 18 the user action 12 occurred and the measured latency 20 for the user action 12. The graph 200 illustrates the raw datapoints for the user activities 206 received from the latency logs 16. The raw datapoints are used to approximate the unbiased distribution of latency 28 (FIG. 1).

The graph 200 illustrates the biased distribution of the user activities 206, the distribution of latency over time for the user actions 12. At a certain point in time on the x-axis 204, the user 104 performed a user action 12, as indicated by the time 18 recorded in the latency log 16, and the graph 200 illustrates the experienced latency for the sampled user activities 206 at the time 18. For example, a timeframe may be selected (e.g., two months) for the x-axis 204 and the user actions 12 that occurred within the timeframe may be presented on the graph 200.

To an extent a user has preferences for latency, the biased distribution already reflects the user's preferences. For example, if the user 104 prefers lower latency, more users' activities 206 occur during the lower latencies (e.g., the user 104 performed more user actions 12) and less user activities 206 occur during the higher latencies (e.g., the user 104 performed less user actions 12), as illustrated in the graph 200.

The graph 200 also illustrates sampled datapoints 208 within the user activities 206 that are used for constructing the unbiased distribution of latency 28 (FIG. 1). The sampled datapoints 211, 214, 218, 222, 226, 230, 234, 238 are selected at random times 210, 212, 216, 220, 224, 228, 232, 236 on the x-axis 204. In some implementations, the sampled datapoints 211, 214, 218, 222, 226, 230, 234, 238 are selected as the user activity 12 that is closest in time 18 to the selected times 210, 212, 216, 220, 224, 228, 232, 236. For example, for selected time 216, the sampled datapoint 218 is selected as the user activity 12 that occurred at a time 18 that is closest to the selected time 216 (e.g., the user activity occurred at the same time 18 as the selected time 216 or within a few seconds of the selected time 216).

In some implementations, the sampled datapoints 211, 214, 218, 222, 226, 230, 234, 238 are an average of the user activities that are close in time to the selected time 210, 212, 216, 220, 224, 228, 232, 236. For example, for the selected time 220, the sampled datapoint 222 is an average of the user activities that occur close in time to the selected time 220. A plurality of user activities (e.g., user actions 12) may have occurred within a timeframe of the selected time 220 (e.g., within five minutes of the selected time 220) and the average latencies 20 of the plurality of user activities may be used as the sampled datapoint 222 for the selected time 220.

In some implementations, the sampled datapoints 211, 214, 218, 222, 226, 230, 234, 238 are randomly selected from the user activities that are close in time to the selected time 210, 212, 216, 220, 224, 228, 232, 236. For example, for the selected time 228, the sampled datapoint 230 is randomly selected from among the different user activities that occurred close in time to the selected time 228.

As such, the sampled datapoints 211, 214, 218, 222, 226, 230, 234, 238 may be an approximation of the latency at the chosen random times 210, 212, 216, 220, 224, 228, 232, 236, and the data processing module 108 may approximate the unbiased distribution of latency 28 by drawing samples of the user's activities at random from the biased samples corresponding to the actual user activity 206.

Figure 3:
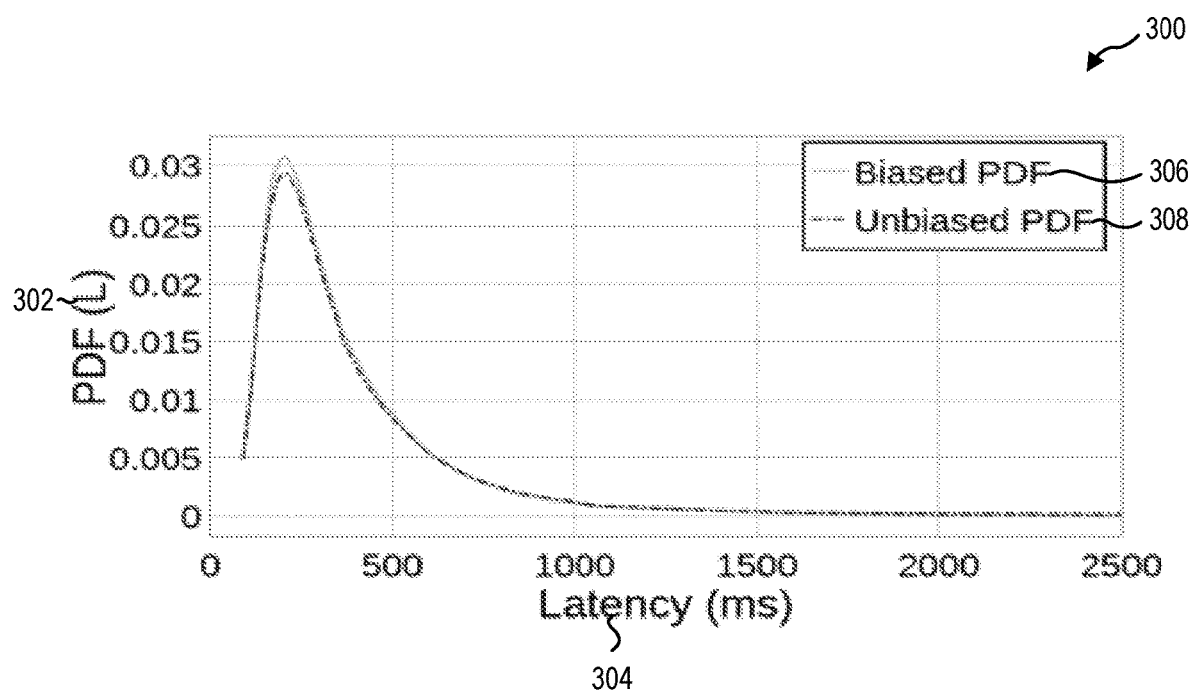
FIG. 3 illustrates an example graph illustrating probability density functions (PDF) of the biased distribution of latency and the unbiased distribution of latency in accordance with implementations of the present disclosure.

Referring now to FIG. 3, the graph 300 illustrates the biased probability density function 306 of the biased distribution of latency 26 (FIG. 1) and the unbiased probability density function 308 of the unbiased distribution of latency 28 (FIG. 1). The probability density functions illustrate a distribution of the number of user actions 12 with a latency. The y-axis 302 is the probability density function and the x-axis 304 is the latency 20 (FIG. 1). A higher point on the curve illustrates more samples of user activities (e.g., user actions 12) at the latency 20 and a lower point on the curve illustrates less samples of user activities (e.g., user actions 12) at the latency 20. As such, for any measured latency 20, the graph 300 illustrates the probability of user activities occurring for the latency 20. The biased PDF 306 is shifted left slightly compared to the unbiased PDF 308, and thus, more of the user actions 12 occur towards the left with the lower latencies as compared to the unbiased distribution of the user actions 12.

Figure 4:
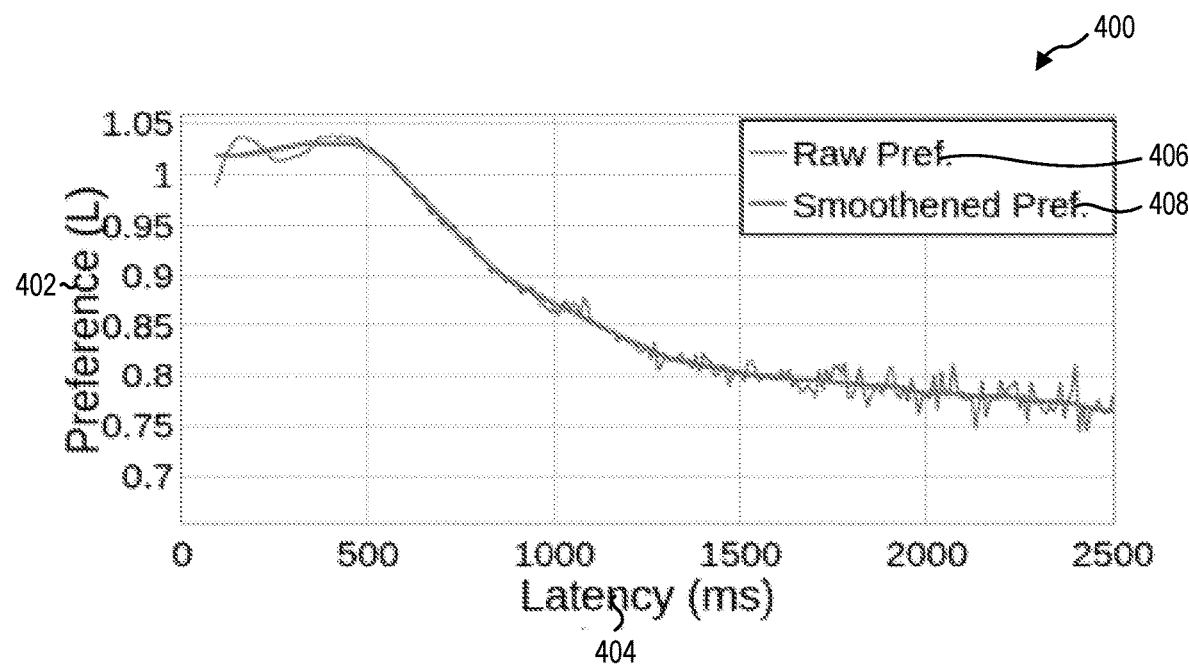
FIG. 4 illustrates an example graph illustrating a latency preference in accordance with implementations of the present disclosure.

Referring now to FIG. 4, the graph 400 illustrates a latency preference 34 (FIG. 1). The latency preference 34 may be computed by the data processing module 108 (FIG. 1) as the raw ratio of B/U and smoothed, where B is the biased distribution of latency 26 and U is the unbiased distribution of latency 28. The y-axis 402 is the latency preference 34 and the x-axis 404 is the latency 20.

The raw latency preference curve 406 illustrates, for any value of latency on the x-axis 404, the latency preference 34 for the latency 20 (e.g., the ratio of dividing the biased distribution of latency by the unbiased distribution of latency). The graph 400 also illustrates a smoothed preference curve 408. For example, the data processing module 108 may perform additional processing to smooth out the raw latency preference curve 406. If the user 104 prefers lower latency, the latency preference 34 is higher for lower latencies and lower for higher latencies. For example, in the latency range of 0 to 500 ms, the graph 400 illustrates a disproportionate share of user activities (e.g., user actions 12) and in the latency range of 2,000 to 2,500 ms, the graph 400 illustrates a lower share of user activities (e.g., user actions 12).

Figure 5:
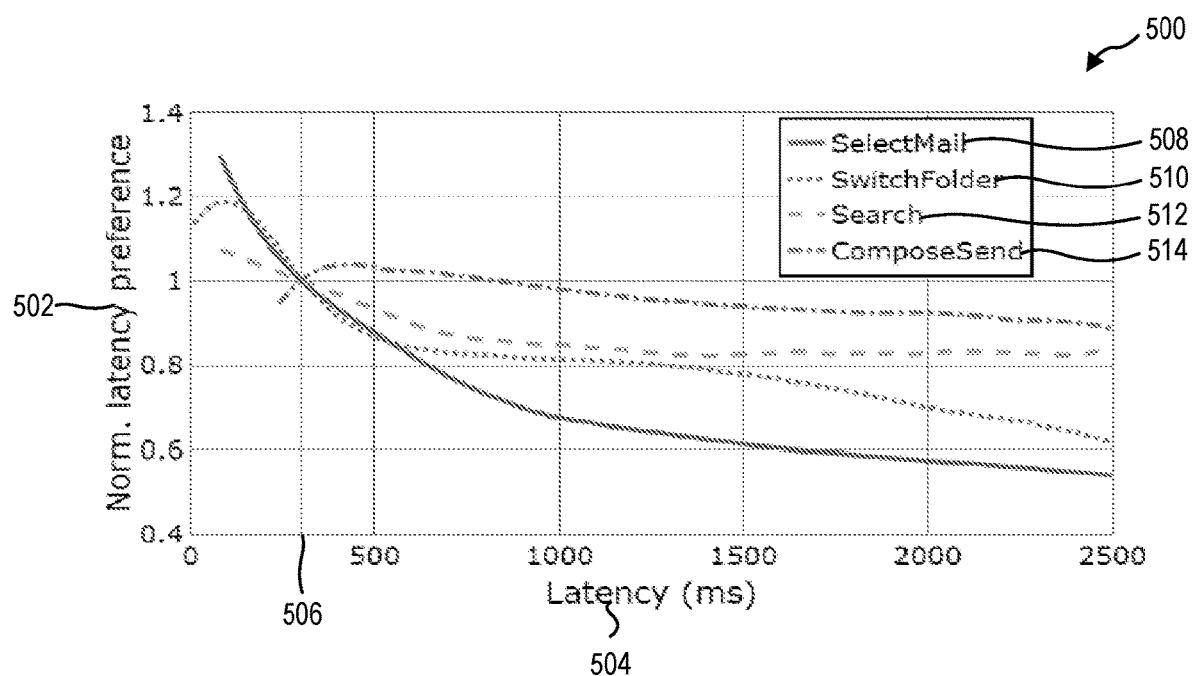
FIG. 5 illustrates an example graph illustrating a normalized latency preference for different user actions for an application in accordance with implementations of the present disclosure.

Referring now to FIG. 5, the graph 500 illustrates a normalized latency preference 38 (FIG. 1) for different user actions 12 (FIG. 1) for an application 10 (FIG. 1) as a function of latency 20 (FIG. 1). The data processing module 108 (FIG. 1) may calculate the normalized latency preference 38 by dividing the latency preference 34 (FIG. 1) by a reference latency 36 (FIG. 1), a selected value of latency 506. The y-axis 502 is the normalized latency preference 38 and the x-axis 504 is the latency 20. The selected value of latency 506 is 300 ms. As such, all of the values of the latency preference 34 are divided by the selected value of latency 506, 300 ms. By normalizing the latency, the graph 500 may compare different normalized latency preference curves for different user actions 12 based on the same reference latency 36.

An example use case for a web mail service includes different types of user actions 12 for selecting mail, switching folders, searching, and composing and sending a message. The normalized latency preference curve 508 illustrates the normalized latency preference 38 for the selecting mail user action 12. The normalized latency preference curve 510 illustrates the normalized latency preference 38 for the switching folders user action 12. The normalized latency preference curve 512 illustrates the normalized latency preference 38 for the searching user action 12. The normalized latency preference curve 514 illustrates the normalized latency preference 38 for the composing and sending a message user action 12. For example, at 300 ms, the normalized latency preference 38 is set to 1 for all the different curves, and thus, a common reference point for the curves 508, 510, 512, 514 for the different user actions 12 of an application 10 (e.g., select mail, switch folders, search, compose and send) is determined.

One benefit of the normalized latency preference is the graph 500 may easily show the relative drop in latency preference as compared to the reference latency 506 (e.g., the latency preference dropped 40 percent from the reference latency). For example, the graph 500 illustrates that the normalized latency preference 38 drops sharply for the select mail user action 12 and for the switch folder user action 12, reflecting an expectation of "instantaneous" response the users 104 may have for the select mail and switch folder user actions 12. As the latency grows to 500 ms, 1000 ms, and 1500 ms, respectively, the normalized latency preference 38 drops to 0.88, 0.68, and 0.61, respectively, and thus, indicating that the increase in latency to 500 ms, 1000 ms, and 1500 ms reduces the incidence of user activity by 12%, 32%, and 39%, respectively, relative to the reference latency of 300 ms.

The graph 500 illustrates that the search user action 12 has a less steep drop off in the normalized latency preference 38, suggesting that users 104 may be conditioned to tolerating a higher latency 20 for the search operation. The compose and send user action 12 is an asynchronous operation, wherein the user interface returns control to the user 104 even as the email is queued up and sent in the background by the server 106. The asynchronous operation may explain why the normalized latency preference 38 remains nearly flat for the compose and send user action 12, indicating that there is little sensitivity to latency 20 for the compose and send user action 12.

The differences in the normalized latency preferences 38 may be used to provide recommendations 42 for identifying different areas of the application 10 to improve the latency of the application 10 and/or the user's 104 experience with the application 10.

Figure 6:
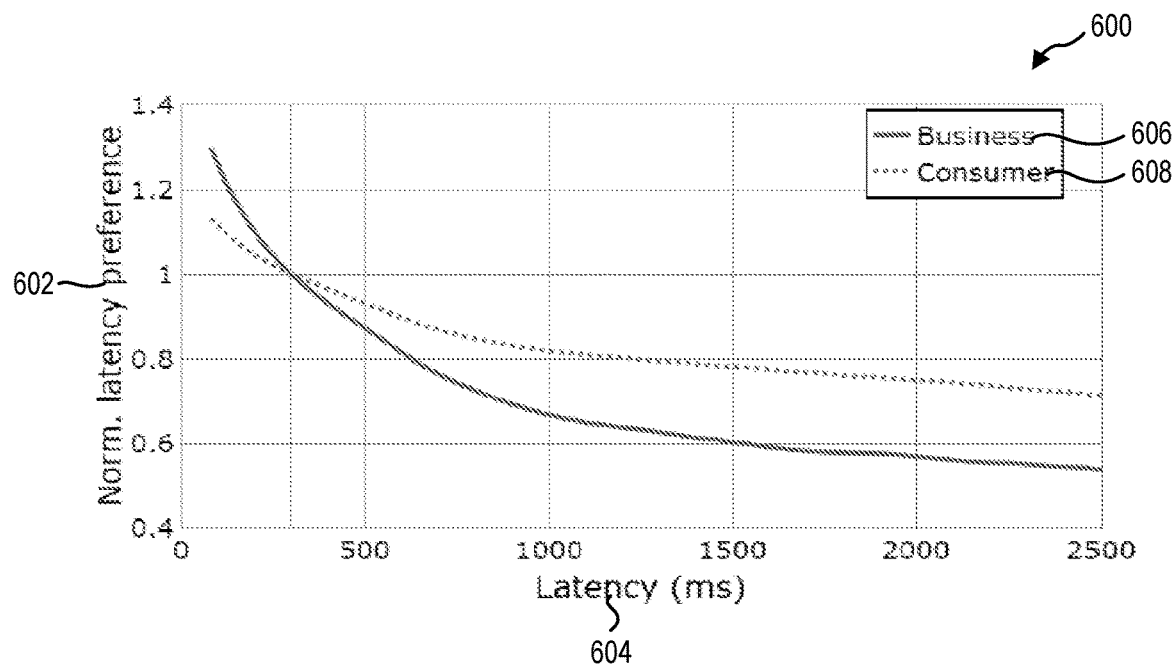
FIG. 6 illustrates an example graph illustrating a normalized latency preference for a user action for different groups of users in accordance with implementations of the present disclosure.

Referring now to FIG. 6, illustrated is a graph 600 illustrating a normalized latency preference for a user action 12 (FIG. 1) for different groups of users 104 (FIG. 1). The y-axis 602 is the normalized latency preference 38 and the x-axis 604 is the latency 20. For example, the user action 12 is a select mail action for a web mail service and the groups of users 104 are business users who pay for the mail service and consumers who receive the mail service for free. The normalized latency preference curve 606 illustrates the normalized latency preference 38 for the business users for the select mail user action 12, and the normalized latency preference curve 608 illustrates the normalized latency preference 38 for the consumers for the select mail user action 12. The graph 600 illustrates a sharper drop in normalized latency preference 38 for the business users as compared to the consumers who receive the mail service for free. The graph 600 may be used to provide recommendations 42 based on insights provided by the latency preference among different user groups. For example, the business users who pay for the service may have less tolerance for latency as compared to the consumers who receive the service for free.

Figure 7:
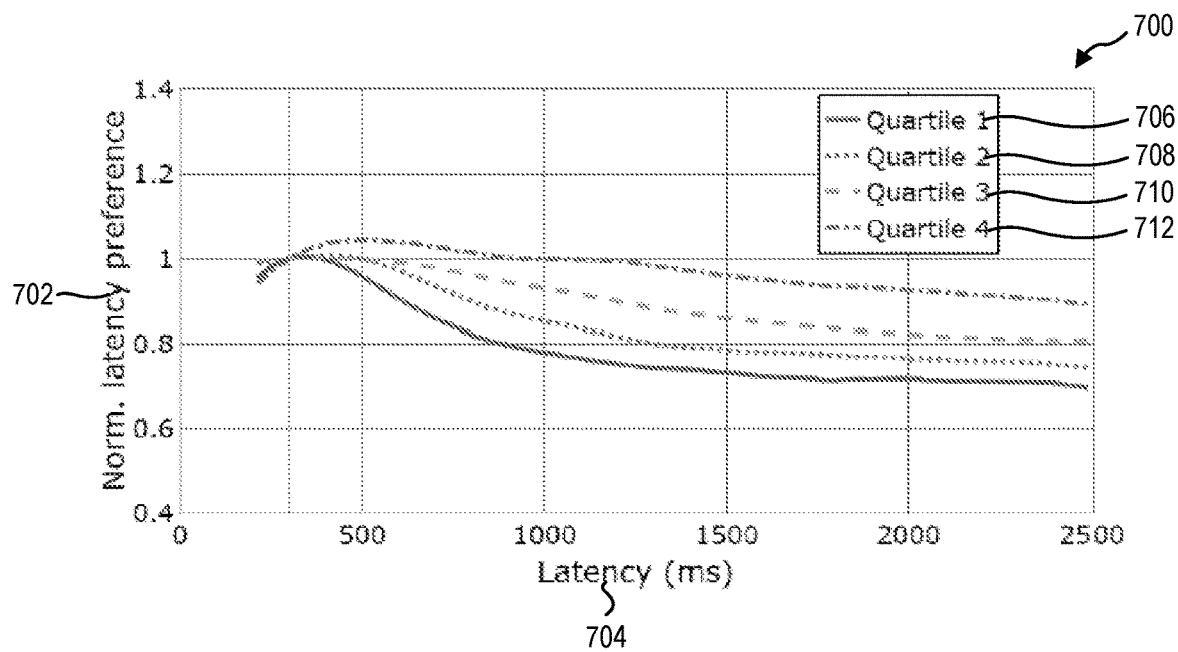
FIG. 7 illustrates an example graph illustrating a normalized latency preference for different groups of users for a user action in accordance with implementations of the present disclosure.

Referring now to FIG. 7, illustrated is a graph 700 illustrating a normalized latency preference 38 (FIG. 1) for a user action 12 (FIG. 1) for different groups of users 104 (FIG. 1). The y-axis 702 is the normalized latency preference 38 and the x-axis 704 is the latency 20. The different groups of users may be segmented into quartiles based on a median latency calculated using the network speeds of the users 104. For example, quartile 1 corresponds to the users with the lowest latency (e.g., fastest network speeds) and quartile 4 corresponds to the users with the highest latency (e.g., slowest network speeds). The data module 108 may use an anonymized user identifier to compute the per-user median latency, which enables grouping the users 104 into quartiles while maintaining the data privacy of the users 104.

The normalized latency preference curve 706 illustrates the normalized latency preference 38 for the quartile 1 user group. The normalized latency preference curve 708 illustrates the normalized latency preference 38 for the quartile 2 user group. The normalized latency preference curve 710 illustrates the normalized latency preference 38 for the quartile 3 user group. The normalized latency preference curve 712 illustrates the normalized latency preference 38 for the quartile 4 user group.

The graph 700 illustrates a consistent trend, with the sensitivity to latency decreasing progressively from the quartile 1 user group to the quartile 4 user group for the same latency value. The graph 700 may be used to provide insights provided by the latency preference among different user groups. For example, the users 104 who are used to a lower latency may be more sensitive to latency as compared to the users 104 who are used to higher latency.

Figure 8:
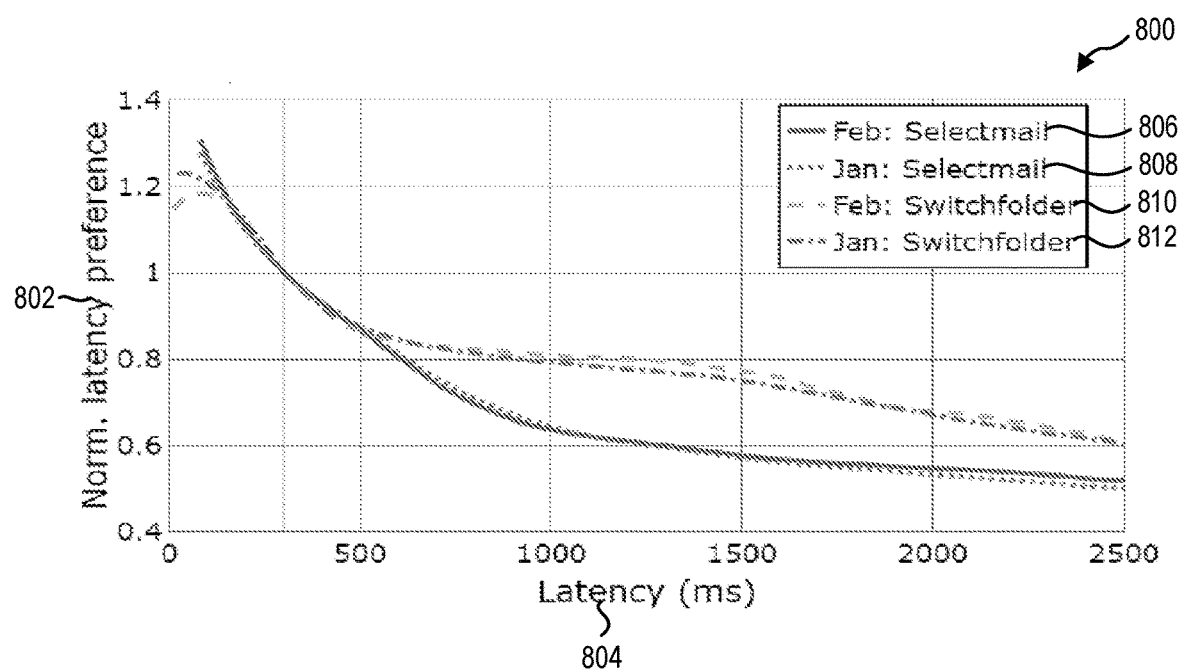
FIG. 8 illustrates an example graph illustrating a normalized latency preference for different user actions across different months of the year in accordance with implementations of the present disclosure.

Referring now to FIG. 8, illustrated is a graph 800 illustrating a normalized latency preference 38 (FIG. 1) for different user actions 12 (FIG. 1) in different months of the year. The y-axis 802 is the normalized latency preference 38 and the x-axis 804 is the latency 20. For example, the graph 800 illustrates the select mail user action 12 for an online web email service and the switch folder user action 12 for the online web email service. The normalized latency preference curve 806 illustrates the normalized latency preference 38 for a plurality of users for the select mail user action 12 in the month of February. The normalized latency preference curve 808 illustrates the normalized latency preference 38 for a plurality of users for the select mail user action 12 in the month of January. The normalized latency preference curve 810 illustrates the normalized latency preference 38 for a plurality of users for the switch folder user action 12 in the month of February. The normalized latency preference curve 812 illustrates the normalized latency preference 38 for a plurality of users for the switch folder user action 12 in the month of January. The graph 800 may be used to provide insights based on the latency preference among the plurality of users 104. For example, the graph 800 illustrates consistency in the drop off in the normalized latency preference 38 across the different months, such may suggest that the users' 104 sensitivity to latency 20 for the selected user actions 12 remains stable over the timeframe considered (e.g., the months of January and February).

Figure 9:
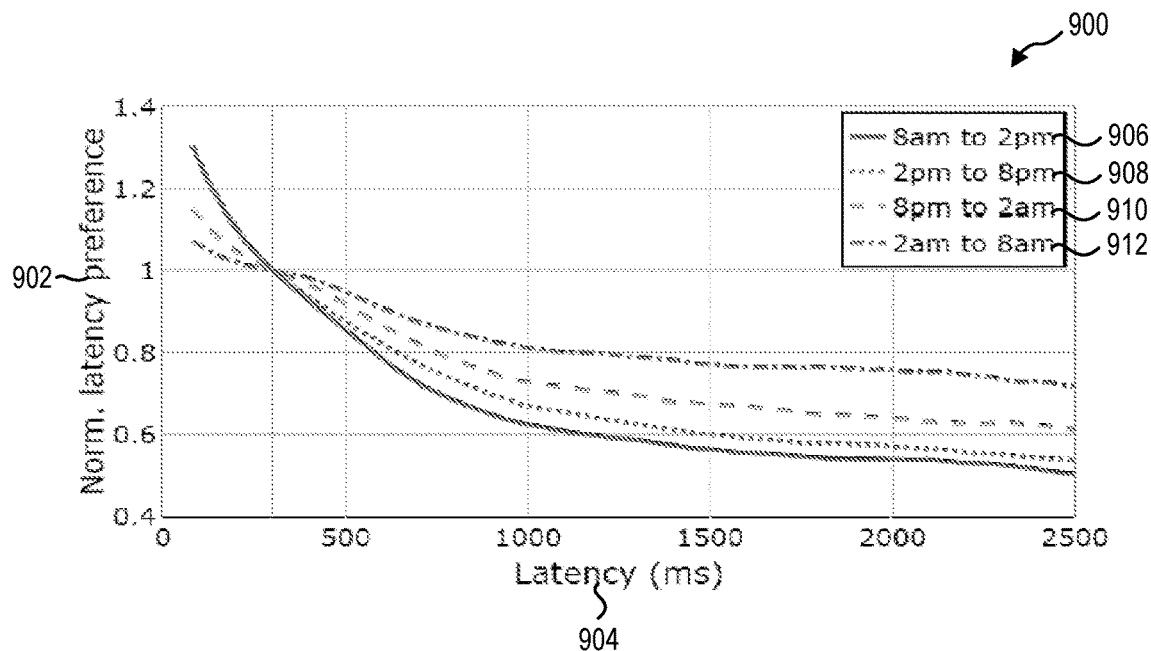
FIG. 9 illustrates an example graph illustrating a normalized latency preference for a user action for different times of day in accordance with implementations of the present disclosure.

Referring now to FIG. 9, illustrated is a graph 900 illustrating a normalized latency preference 38 (FIG. 1) for a user action 12 (FIG. 1) for different times of day. The y-axis 902 is the normalized latency preference 38 and the x-axis 904 is the latency 20. For example, the user action 12 is a select mail user action for an online email service and the different times of day may be split into six hour periods. The normalized latency preference curve 906 illustrates the normalized latency preference 38 for the plurality of users 104 during the time period of 8 am to 2 pm for the select mail user action 12. The normalized latency preference curve 908 illustrates the normalized latency preference 38 for the plurality of users 104 during the time period of 2 pm to 8 pm for the select mail user action 12. The normalized latency preference curve 910 illustrates the normalized latency preference 38 for the plurality of users 104 during the time period of 8 pm to 2 am for the select mail user action 12. The normalized latency preference curve 912 illustrates the normalized latency preference 38 for the plurality of users 104 during the time period of 2 am to 8 am for the select mail user action 12.

The graph 900 illustrates in each time period, a consistent trend with the normalized latency preference 38 decreasing as latency increases. The graph 900 also illustrates that the drop in the normalized latency preference 38 is sharper during the daytime periods as compared to during the nighttime periods. The graph 900 may be used to provide recommendations 42 based on insights provided by the latency preference among different users. For example, the users 104 that are active late in the night may have a compelling reason to do so, and therefore, may be less sensitive to latency 20.

Figure 10:
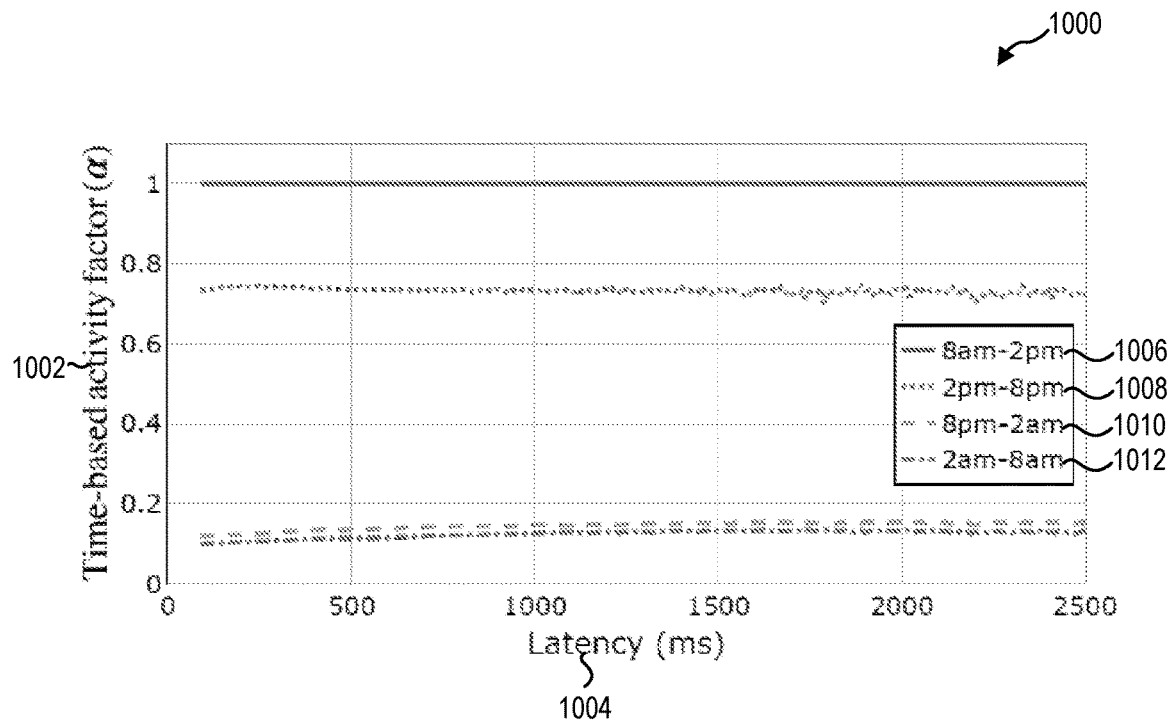
FIG. 10 illustrates an example graph illustrating a time-based activity confounding factor for a user action in accordance with implementations of the present disclosure.

Referring now to FIG. 10, illustrated is a graph 1000 illustrating a time-based activity confounding factor 40 (FIG. 1) for a user action 12 (FIG. 1). The graph 1000 illustrates the effect of the time-based activity confounding factor 40 on the normalized latency preference 38 for the user action 12. The y-axis 1002 is the time-based activity confounding factor 40 and the x-axis 1004 is the latency 20.

For example, the user action 12 is a select mail user action for an online email service and the different times of day may be split into six hour periods. The normalized latency preference curve 1006 illustrates the normalized latency preference 38 for the plurality of users 104 during the time period of 8 am to 2 pm for the select mail user action 12 adjusted based on the time-based activity confounding factor 40. The normalized latency preference curve 1008 illustrates the normalized latency preference 38 for the plurality of users 104 during the time period of 2 pm to 8 pm for the select mail user action 12 adjusted based on the time-based activity confounding factor 40. The normalized latency preference curve 1010 illustrates the normalized latency preference 38 for the plurality of users 104 during the time period of 8 pm to 2 am for the select mail user action 12 adjusted based on the time-based activity confounding factor 40. The normalized latency preference curve 1012 illustrates the normalized latency preference 38 for the plurality of users 104 during the time period of 2 am to 8 am for the select mail user action 12 adjusted based on the time-based activity confounding factor 40. For example, the data processing module 108 may adjust the normalized latency preference 38 based on the calculated time-based activity confounding factor 40.

The graph 1000 may be used to provide recommendations 42 based on insights provided by the latency preference among different users 104. For example, the time-based activity confounding factor 40 is lower during the late periods, reflecting a lower level of user activity at night, regardless of the latency 20. Moreover, the time-based activity confounding factor 40 remains flat across the latency range. The insights may be used to improve the latency 20 of the user action 12, and thus, improve the users' 104 interaction with the web email service.

Figure 11:
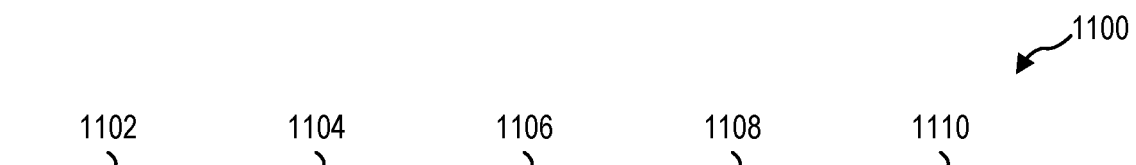
FIG. 11 illustrates an example table illustrating adjusting a normalized latency preference based on a time-based activity confounding factor in accordance with implementations of the present disclosure.

Referring now to FIG. 11, the table 1100 illustrates an adjustment of the normalized latency preference 38 (FIG. 1) based on a time-based activity confounding factor 40 (FIG. 1). In the table 1100, time is discretized into two equal-length slots ("day" and "night") and latency is divided into two bins ("low latency" and "high latency"). The column 1102 illustrates the time slots (e.g., day or night), the column 1104 illustrates the latency (e.g., "low" or "high"), the column 1106 illustrates a number of user actions (e.g., user actions 12), the column 1108 illustrates a percentage of the time with this latency, and the column 1110 illustrates the normalized number of user actions.

If the data processing module 108 had ignored the time-based activity confounding factor 40, the data processing module 108 may have computed the user's 104 level of activity when the latency 20 is "low" as $$(90+24)/(30+80)=1.04 \qquad (2)$$

actions per unit time, and that when the latency 20 is "high" as $$(140+4)/(70+20)=1.6 \qquad (3)$$

actions per unit time. The calculation of the user's 104 level of activity indicates that the user 104 performs more actions when the latency 20 is "high" as compared to when the latency 20 is "low."

Instead, if the data processing module 108 treats the "day" time slot as the reference and normalizes the counts corresponding to the "night" time slot, the time-based factor would be estimated as $$\alpha_{night,low}=(26/80)/(90/30)=0.108 \qquad (4)$$

and $$\alpha_{night,high}=(4/20)/(140/70)=0.100, \qquad (5)$$

so $$\alpha_{night}=(0.108+0.100)/2=0.104 \qquad (6)$$

(e.g., the average of $\alpha$ across the latency bins). Therefore, the normalized count of actions during the night is $$26/0.104=250 \text{ and } 4/0.104=38, \qquad (7)$$

respectively, for the "low" and "high" latency bins. Combining the normalized counts with those from the day, the user's level of activity is estimated as $$(90+250)/(30+80)=3.09 \qquad (8)$$

actions per unit time when the latency is "low" and as $$(140+38)/(70+20)=1.97 \qquad (9)$$

actions per unit time when the latency is "high." That is, the level of user activity is higher when the latency is "low" (e.g., more user actions 12) compared to when the latency is "high" (e.g., fewer user actions 12). As such, table 1100 illustrates the changes to the normalized latency preference 38 by adjusting for the time-based activity confounding factor 40.

Figure 12:
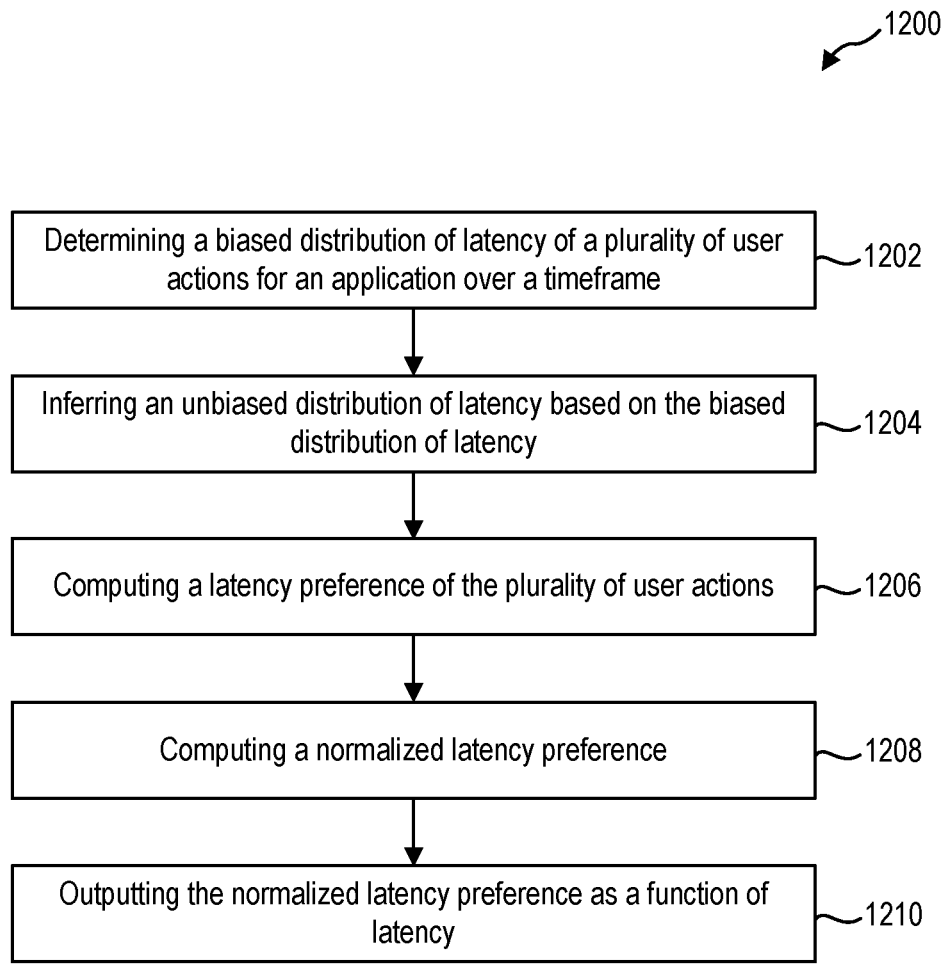
FIG. 12 illustrates an example method for identifying latency preferences in accordance with implementations of the present disclosure.

Referring now to FIG. 12, illustrated is an example method 1200 for identifying latency preferences of users. The actions of the method 1200 are discussed below with reference to the architecture of FIG. 1.

At 1202, the method 1200 includes determining a biased distribution of latency of a plurality of user actions for an application over a timeframe. The data processing module 108 may determine a biased distribution of latency 26 of a plurality of user actions 12 for an application 10. The biased distribution of latency 26 includes a latency 20 for each user action 12. The latency 20 of the user actions 12 may be obtained from a latency log 16 on the server 106. The latency log 16 may aggregate the plurality of user actions 12 received from a plurality of users 104. The latency log 16 also indicates a time 18 when the user action occurred (e.g., a time at which the user action 12 is initiated by the user 104).

The latency log 16 may include a tuple of data (the time 18, the user action 12, the latency 20, and/or any metadata 22) for every user action 12 received from the plurality of users 104 for the application. Each entry in the latency log 16, is annotated with a type of user action 12 (e.g., placing an item in a shopping cart, initiating a search, opening an email message), the time 18 the user action started (e.g., a timestamp indicating when a user action 12 is initiated), and the measured latency 20 for the user action 12 (e.g., from the time an action is initiated until a response is received).

The latency log 16 may also include the metadata 22 for the user 104 (e.g., an anonymized user identification of the user 104). The metadata 22 may be obtained from user profile information of the users 104 and/or a context of the users 104 (e.g., time of day, location of the user). Example metadata 22 includes a subscription type of the user 104 (e.g., whether the user 104 is a business user paying for the service or a consumer user using the service for free), a type of the user action 12, a location of the user 104 when accessing the application 10, and/or an indication of the quality network connectivity of the user 104. The metadata 22 may be used to identify characteristics of the users 104 and/or a context of the user action 12 and segregate the analysis of the data included in the latency log 16 based on user groups and/or different contexts.

The data processing module 108 may use the latency log 16 to construct the biased distribution of latency 20 for the user actions 12 for the application 10. The data processing module 108 uses the latency 20 of each user action 12 at the time 18, as recorded in the latency log 16, to determine the biased distribution of latency 26 for the user actions 12. The data processing module 108 may use one or more machine learning models to process and/or analyze the large volume of data obtained in the latency logs 16.

At 1204, the method 1200 includes inferring an unbiased distribution of latency based on the biased distribution of latency. The data processing module 108 may use the biased distribution of latency 26 to infer an unbiased distribution of latency 28. The unbiased distribution of latency 28 may be estimated by sampling random points in time and picking out the temporally nearest samples from the biased distribution of latency 26. The unbiased distribution of latency 28 may reflect the inherent or underlying latency distribution independent of the user actions 12.

The data processing module 108 may approximate the unbiased distribution of latency 28 samples by selecting random points in time 24 within the timeframe of the biased distribution of latency 26 and using the latency 20 for a user action 12 at the chosen random points in time 24, or close to the chosen points in time 24, for the unbiased distribution of latency 28.

The data processing module 108 may select a latency sample (e.g., the latency 20 of a user action 12 at a time 18) that is closest in time to the chosen point in time 24. In some implementations, if there are multiple latency samples at the chosen point in time 24, the data processing module 108 may pick one of the latency samples at random (e.g., selecting one of the measured latency 20 of the user actions 12 with times 18 that are close to the chosen point in time 24). In some implementations, if there are multiple latency samples at the chosen point in time, the data processing module 108 may take an average of the latency samples (e.g., take an average of the measured latency 20 of the user actions 12 with times 18 that are close to the chosen point in time 24). By taking the latency samples at random times, the data processing module 108 may get a sample of the measured the latency 20 at times not influenced by the user's 104 choice.

At 1206, the method 1200 includes computing a latency preference of the plurality of user actions. The data processing module 108 may compute the latency preference 34 as a ratio of a PDF of the biased distribution of latency (e.g., biased PDF 30) and a PDF of the unbiased distribution of latency (e.g., unbiased PDF 32). The data processing module 108 may construct an unbiased PDF 32 of the unbiased distribution of latency 28. The data processing module 108 may also calculate a latency preference 34 corresponding to each latency. The data processing module 108 calculates the latency preference 34 as the ratio of the biased PDF 30 and the unbiased PDF 32. The latency preference 34 may be a noisy curve, and thus, the data processing module 108 may perform processing to smooth the latency preference 34.

At 1208, the method 1200 includes computing a normalized latency preference. The data processing module 108 may also select a preference corresponding to a reference latency 36 and may normalize the latency preference 34 to obtain a normalized latency preference 38. The data processing module 108 may divide the other latency values in the latency preference 34 by the latency preference corresponding to the reference latency 36 to generate the latency values in the normalized latency preference 38.

The data processing module 108 may generate different normalized latency preferences 34 for different groups of users 104. In addition, the data processing module 108 may generate different normalized latency preferences 34 for different types of user actions 12. The data processing module 108 may also generate different normalized latency preferences 34 based on the time of day when the plurality of user actions 12 occurred, the location where the plurality of user actions 12 occurred, and/or a date when the plurality of user actions 12 occurred. The data processing module 108 may use a variety of factors or a combination of factors from the metadata 22 in determining the different normalized latency preferences 34.

The data processing module 108 may also identify one or more confounding factors 40 that may impact the user actions 12 with the application 10. The data processing module 108 may adjust the normalized latency preference 38 based on the confounding factors 40 to mitigate or minimize an effect of the confounding factors 40 on the normalized latency preference 38. Example confounding factors 40 include, but are not limited to, a time-based activity factor, content driven user activity preference, or previous user conditioning based on the typical latency the users' experience and have come to expect. Each confounding factor 40 may impact the level of user activity, separate from the impact of latency.

At 1210, the method 1200 includes outputting the normalized latency preference as a function latency. The data processing module 108 may output the normalized latency preference 38 as a function of latency. The normalized latency preference 38 may be used to generate one or more recommendations 42 for the application functionality to be prioritized for latency improvement. The recommendations 42 may be based on analyzing the normalized latency preference. For example, the data processing module 108 may analyze the different normalized latency preferences 38 (e.g., a normalized latency preference 38 for different groups of users, a normalized latency preference 38 for different action types of user actions, a normalized latency preference 38 for user actions at different times of the day) and generate one or more recommendations 42 based on the analysis. The recommendations 42 may identify one or more areas of the application to modify or change to reduce an amount of latency for the application.

As such, the method 1200 may be used to automatically analyze an impact of latency 20 on user activities 12 by leveraging the variation of latency seen in the normal course of the user activities 12 with an application 10.

Figure 13:
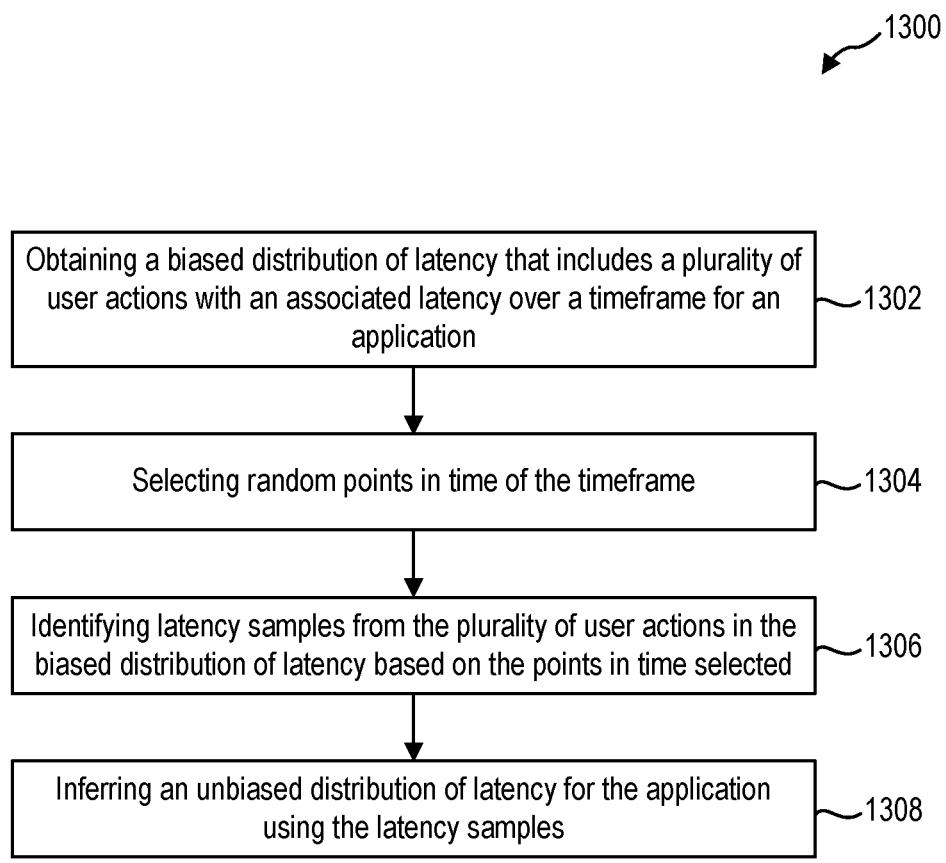
FIG. 13 illustrates an example method for determining an unbiased latency in accordance with implementations of the present disclosure.

Referring now to FIG. 13, illustrated is an example method 1300 for determining an unbiased latency. The actions of the method 1300 are discussed below with reference to the architecture of FIG. 1.

At 1302, the method 1300 includes obtaining a biased distribution of latency that includes a plurality of user actions with an associated latency over a timeframe for an application. The biased distribution of latency 26 is based on logs of user actions from a plurality of users 104 interacting with the application 10.

At 1304, the method 1300 includes selecting random points in time of the timeframe of the biased distribution of latency. The data module 108 may repeatedly pick points in time 24 at random within the timeframe of the biased distribution of latency 26.

At 1306, the method 1300 includes identifying latency samples from the plurality of user actions in the biased distribution of latency based on the points in time selected. The data processing module 108 may identify a measurement from the plurality of user actions that is closest in time 18 to a selected point in time 24 and using the measurement (e.g., the latency 20) of the user action 12 that is closest in time 18 as a latency sample for the selected point in time 24. The data processing module 108 may also identify one or more user actions 12 of the plurality of user actions that are close in time 18 to a selected point in time 24 and take an average latency 20 of the one or more user actions 12 as a latency sample for the selected point in time 24. The data processing module 108 may also identify one or more user actions 12 of the plurality of user actions that are close in time 18 to a selected point in time 24 and randomly selecting a latency 20 of the one or more user actions 12 as a latency sample for the selected point in time 24.

At 1308, the method 1300 includes inferring an unbiased distribution of latency for the application using the latency samples. The data processing module 108 may use the biased distribution of latency 26 to infer an unbiased distribution of latency 28. The data processing module 108 may use the latency samples from the plurality of user actions in the biased distribution of latency 26 to construct the unbiased distribution of latency 26 for the application 10.

As such, the method 1300 may be used to infer the unbiased distribution of latency 28 and reflect the inherent or underlying latency distribution independent of the user actions 12.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a classification model, a binary model, a regression model, a language model, an object detection model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include random access memory (RAM), read-only memory (ROM), electrically erasable programmable read-only memory (EEPROM), compact disc read-only memory (CD-ROM), solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing, predicting, inferring, and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for identifying latency preferences of users, comprising:
   determining a biased distribution of latency of a plurality of user actions for an application over a timeframe, wherein the biased distribution of latency includes a latency for each user action of the plurality of user actions;
   inferring an unbiased distribution of latency based on the biased distribution of latency by selecting random times within the timeframe of the biased distribution of latency and using the latency for a user action at or close to the chosen random times for the unbiased distribution of latency;
   computing a latency preference of the plurality of user actions as a ratio of a probability density function of the biased distribution of latency and a probability density function of the unbiased distribution of latency;
   computing a normalized latency preference by dividing the latency preference by the latency preference corresponding to a reference latency; and
   outputting the normalized latency preference as a function of latency.

2. The method of claim 1, wherein the latency of the plurality of user actions is obtained from a latency log from a server.

3. The method of claim 2, wherein the latency log aggregates the plurality of user actions from a plurality of users interacting with the application.

4. The method of claim 2, wherein the latency log indicates a time when the user actions occurred.

5. The method of claim 2, wherein the latency log further includes:
   metadata of a plurality of users or metadata for the plurality of user actions, wherein the metadata is obtained from one or more of user profile information, a context of the plurality of users, or an action type of the plurality of user actions.

6. The method of claim 5, wherein the action type identifies a type of the plurality of user actions and the user profile information identifies different groups of the plurality of users.

7. The method of claim 6, wherein different normalized latency preferences are generated for the different groups of the plurality of users.

8. The method of claim 5, wherein different normalized latency preferences are generated for different action types of the plurality of user actions.

9. The method of claim 5, wherein the context of the plurality of users is used to identify one or more of a location where the plurality of user actions occurred, a network connectivity of the users, or a type of user, and
   wherein different normalized latency preferences are generated based on one or more of the location where the plurality of user actions occurred, the network connectivity of the users, or the type of user.

10. The method of claim 1, further comprising:
    adjusting the normalized latency preference based on at least one confounding factor by modifying the normalized latency preference to mitigate an effect of the at least one confounding factor on the normalized latency preference,
    wherein the at least one confounding factor includes a time-based activity factor, content driven user activity preference, or previous user conditioning.

11. The method of claim 1, further comprising:
    generating one or more recommendations for the application functionality to be prioritized for latency improvement, based on analyzing the normalized latency preference.

12. The method of claim 11, wherein the one or more recommendations identify one or more areas of the application to modify or change to reduce an amount of latency for the application.

13. The method of claim 11, wherein analyzing the normalized latency preference is based on analyzing different normalized latency preferences of different groups of users for an action type of the plurality of user actions.

14. The method of claim 11, wherein analyzing the normalized latency preference is based on analyzing different normalized latency preferences for a combination of different groups of users and different action types of the plurality of user actions.

15. The method of claim 10, wherein analyzing the normalized latency preference is based on analyzing the normalized latency preference of a plurality of users for the plurality of user actions during different times of day.

16. A method for determining an unbiased latency, comprising:
    obtaining a biased distribution of latency that includes a plurality of user actions with an associated latency over a timeframe for an application;
    selecting random points in time of the timeframe;
    identifying latency samples from the plurality of user actions in the biased distribution of latency based on the points in time selected; and
    inferring an unbiased distribution of latency for the application using the latency samples.

17. The method of claim 16, wherein the biased distribution of latency is based on logs of user actions from a plurality of users interacting with the application.

18. The method of claim 16, wherein identifying the latency samples includes:
    identifying a measurement from the plurality of user actions that is closest in time to a selected point in time and using the latency of a nearest user action as a latency sample for the selected point in time.

19. The method of claim 16, wherein identifying the latency sample includes:
    identifying one or more user actions of the plurality of user actions that are close in time to a selected point in time and taking an average latency of the one or more user actions as a latency sample for the selected point in time.

20. The method of claim 16, wherein identifying the latency sample includes:
    identifying one or more user actions of the plurality of user actions that are close in time to a selected point in time and randomly selecting a latency of the one or more user actions as a latency sample for the selected point in time.

* * * * *